(No Model.)

J. R. BURNS.
POUND FOR LOBSTERS.

No. 399,241. Patented Mar. 12, 1889.

Witnesses:
B. F. Larrabee
J. E. Lynch

Inventor:
James R. Burns.
per atty.
Elgin B. Verrill.

UNITED STATES PATENT OFFICE.

JAMES R. BURNS, OF FRIENDSHIP, MAINE.

POUND FOR LOBSTERS.

SPECIFICATION forming part of Letters Patent No. 399,241, dated March 12, 1889.

Application filed January 4, 1889. Serial No. 295,436. (No model.)

*To all whom it may concern:*

Be it known that I, JAMES R. BURNS, of Friendship, in the county of Knox and State of Maine, have invented certain new and useful Improvements in Pounds for Keeping and Fattening Lobsters; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in pounds for keeping and feeding lobsters, &c.

It consists of a case having a series of compartments arranged one above the other, each compartment having a chute extending down into it from the top, and doors or other means through which the fish may be removed.

Figure 1:
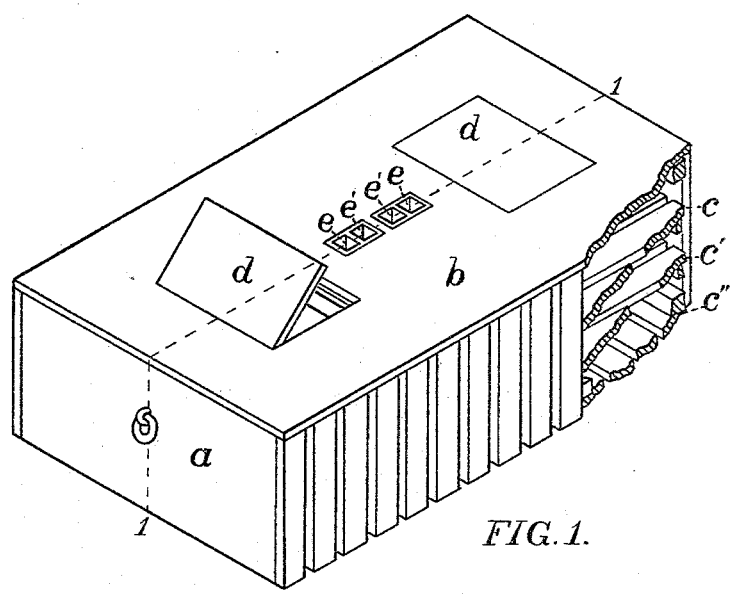
Figure 2:
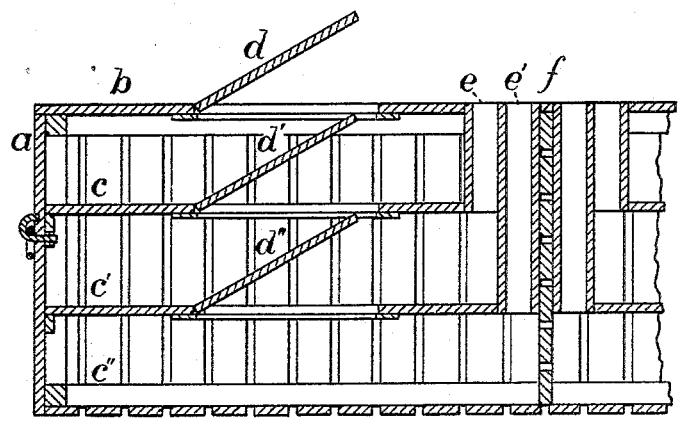

Reference being had to the accompanying drawings, Figure 1 is an isometric view showing part broken out; and Fig. 2, a cross-section of Fig. 1 on line 1 1, and same letters refer to like parts.

My invention may be thus described:

A case of any suitable material is made with a series of floors, $c$ $c'$ $c''$, one above the other, thus dividing the inside of the case into compartments. The various floors and the sides may be made of slats set some distance apart, or wire-netting, or any suitable material, such as will allow the water to circulate freely through the case. In the cover $b$ of the case is made a door, $d$, through which the fish are to be removed. In each of the floors $c$ $c'$ are made doors $d'$ $d''$, respectively. These doors should be arranged one directly over the other. Independent openings $e$ $e'$ are made to extend from the top $b$ down into each of the compartments, or at least into each except the top one. Through these chutes the fish themselves may be put into the pound and feed can be put into the various compartments. Vertical partitions $f$ divide the pound into two or more sections.

The use and operation of my improved pound are as follows: It is often necessary to keep lobsters for some time after they are caught. Should they be placed in large quantities in a pound having but one bottom, they would kill each other by their own weight. It is very inconvenient to make the pound cover a large amount of surface, as would be required to keep all the fish on one bottom. To obviate these difficulties, I have made the pound with a series of floors or bottoms with doors opening into each successively, as shown and described. Further, a great many lobsters when caught are poor and practically worthless. If they can be kept for a considerable time and fed they become much more valuable. To facilitate the keeping and feeding of the lobsters, I make a pound having successive bottoms, as described, and make chutes opening from the top of the pound down into each compartment separately. The vertical partitions $f$ serve also in some measure to prevent the fish from being crowded to death, for, the pound being made of wood, and consequently buoyant, the said partitions prevent the fish, when the pound is by any means thrown on one end, from all being piled up in the depressed end.

The doors $d$ $d'$ $d''$ may be hung in any convenient manner, and the feed-chutes may be of any convenient size or form, and may have covers.

Instead of the doors $d$ $d'$ $d''$, openings from the top of the pound-doors might be made in the side or end, opening into each compartment. In this case the pound would have to be raised out of the water in order to remove the fish; or a series of draws having perforated sides and bottoms might be used instead of the bottoms $c$ $c'$ $c''$ and doors.

Having thus described my invention and its use, what I claim, and desire to secure by Letters Patent of the United States, is—

A pound consisting of a series of independent compartments arranged one above the other, each compartment having a door through which the fish can be removed, and chutes extending down from the top of the pound into each separate compartment, substantially as and for the purposes specified.

In testimony that I claim the foregoing as my own I affix my signature in presence of two witnesses.

JAMES R. BURNS.

Witnesses:
WILL L. PERHAM,
ELGIN C. VERRILL.